United States Patent Office 3,723,163
Patented Mar. 27, 1973

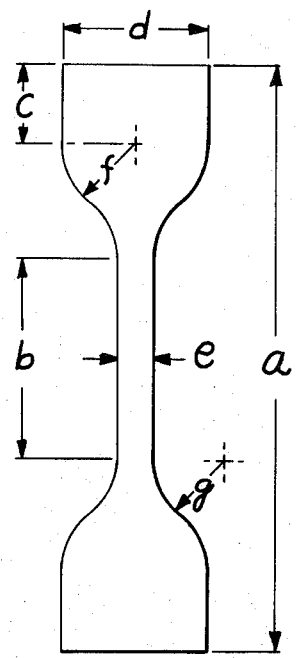

3,723,163
PROCESS FOR SEALING A SURFACE AND RESULTANT SURFACE
Gerald F. Schumacher, St. Paul, Minn., assignor to Minnesota Mining and Manufacturing Company, St. Paul, Minn.
Continuation-in-part of abandoned application Ser. No. 814,754, Apr. 9, 1969. This application May 28, 1971, Ser. No. 147,875
Int. Cl. B32b 13/12; B44d 1/14
U.S. Cl. 117—72
16 Claims

ABSTRACT OF THE DISCLOSURE

A process for sealing concrete by providing a composite of two layers, one layer being capable of bridging cracks in the cement even during extreme temperature variations, and the other layer being tough and abrasion- and wear-resistant, both layers comprising a urethane polymer resulting from in situ curing of evenly applied, separate coatings of moisture curable, isocyanate terminated prepolymer.

---

This application is a continuation-in-part of copending application Ser. No. 814,754, filed Apr. 9, 1969, now abandoned.

This invention relates to a process for sealing concrete; more particularly, it relates to a process for sealing concrete by means of certain polyurethane compositions.

Concrete structures are subject to cracking and other forms of degradation. The problem is particularly pronounced where the concrete is exposed to wide variations in temperature and other weather conditions. The cracks provide passages for water and other fluids which alone or because of dissolved chemicals can prove deleterious to the concrete and reinforcing members, as well as to objects situated below the concrete on which the fluids drip. Especially troublesome is the dripping of water containing corrosive salts through concrete parking decks or ramps onto automobiles below.

Current methods of sealing concrete slabs against fluid penetration through concrete stress cracks utilize various polymeric materials. There is a general consensus among people versed in sealing concrete that all such commercially available systems fail to do an adequate job of stopping moisture and other fluid penetration through concrete stress cracks. These coatings fail for a variety of reasons, especially due to either lack of adhesion and/or their inability to elongate over existing or newly formed cracks in the slab. These cracks change their dimension when exposed to a wide temperature range causing tearing of the applied coating. Until now it was thought to be essential to sacrifice elasticity for toughness in order to provide a wearable surface.

Although there are several prior art techniques relating to sealing individual cracks in concrete surfaces by pouring a curable composition into the crack, such techniques are undesirable for several resasons. For example, the sealing of individual cracks provides no protection against leakage through newly formed cracks. Furthermore, leakage may occur through cracks which are not easily located or detected. Moreover, even if all newly formed cracks can be easily located, this piecemeal sealing of cracks is likely to continue over a period of years as new cracks continue to come into existence. The irregular patchwork resulting from the sealing of individual cracks is also aesthetically undesirable. Consequently, piecemeal sealing of individual cracks is quite inefficient and highly undesirable.

It has been found that prior art urethane compositions which reportedly are useful for the sealing of individual cracks do not provide acceptable sealant coatings within the meaning of the present invention because a continuous sealant coating must meet very stringent requirements. For example, the sealant coating must be easily applied in a thin film, and the coating must be tough and abrasion- and wear-resistant.

It is an object of this invention to provide a method for sealing concrete stress cracks to prevent leakage of deleterious materials therethrough.

Another object is a method which provides a durable, wear-resistant composite coating for sealing concrete stress cracks against leakage.

Another object is the provision of such a method which is economical and easy to perform by unskilled labor.

Another object is to provide a means for the sealing of a concrete surface to prevent leakage of materials therethrough even though new cracks may subsequently come into existence.

These and other objects are accomplished by the present invention which in general comprises applying a thin base layer comprising at least one coating comprising a moisture curable, NCQ terminated prepolymer, wherein Q is oxygen or sulfur, to concrete or other surface, and allowing said prepolymer to cure in the presence of moisture to provide cured, resilient, elastomeric, crosslinked polyurethane or polythiourethane. A thin overlayer of polyurethane or polythiourethane which is hard, tough, traffic-durable, flexible, resilient, and wear-resistant is then applied over the base layer, the overlayer being tougher and more wear-resistant than the base layer. The overlayer also exhibits higher tensile strength than the base layer.

In addition to conventional fillers and the like which may also be present, the cured polymer matrix for each layer may contain thoroughly dispersed therethrough up to about 75%, based on the weight of said cured polymer, of an organic resin which is compatible with the polymer (i.e., will not separate and destroy the homogeniety of the matrix and will not react with or interfere with the curing mechanism). Preferred examples of such a resin include a low molecular weight polystyrene, coumarone indene, coal tar, or chlorinated polyphenyl resins.

The coating compositions which are useful for the base layer and the overlayer are one-part, generally solvent-containing systems which are capable of storage in a hermetically sealed container at 25° C. for at least 6 months. Preferred are prepolymers from a polyisocyanate and a polyol having a functionality greater than 2.

While it is preferred to include conventional fillers in the base layer and the overlayer, there are applications where fillers are not required in either of the layers, e.g., where it is desired to seal a surface with a transparent coating.

Moisture curable prepolymers from a polyether or polyester polyol and an equivalent excess of a polyisocyanate in combination with various fillers represent the preferred coating compositions for practicing this invention, the prepolymer simply being applied from a container with a trowel or other suitable means and cured in place by water generally in the form of atmospheric moisture. Two part formulations in which an isocyanate is cured with an organic hydroxy compound or the like not only require on site mixing but also are subject to bubble formation or possibly incomplete curing due to the preference of the NCO-water reaction versus the NCO-organic hydroxyl reaction. Since concrete is known to have an affinity for water, this competing reaction is serious.

In general, the NCQ prepolymers are the reaction product of an equivalent excess of at least one organic polyisocyanate or polythioisocyanate with one or more organic compounds having a plurality of hydroxy, thiol, or amine groups, the molar excess (molar ratio greater than one) being needed to obtain the isocyanate or thioisocyanate termination. The prepolymers generally have an average molecular weight ranging from about 500 to about 10,000, and preferably from 800 to 7,000.

Any of a wide variety of organic polyisocyanates may be employed in the reaction, including aromatic, aliphatic and cycloaliphatic diisocyanates and combinations of these types. The aromatic diisocyanates include 2,4-toluene diisocyanate, mixtures thereof with 2,6-toluene diisocyanate (usually about 80/20 by weight, respectively), methylene bis(4-phenylisocyanate), m-phenylene diisocyanate, 3,3'-dimethyl-4,4'-diphenylene diisocyanate, 3,3'-dimethoxy-4,4'-bisphenylene diisocyanate, 3,3'-diphenyl-4,4'-biphenylene diisocyanate, 4,4'-biphenylene diisocyanate, 4-chloro-1,3-phenylene diisocyanate, 3,3'-dichloro-4,4'-biphenylene diisocyanate, and 1,5-naphthalene diisocyanate. Arylene diisocyanates, i.e., those in which two isocyanate groups are attached directly to an aromatic ring, are preferred. The diisocyanates may contain other substitutents, although those which are free from reactive groups other than the two isocyanate groups are ordinarily preferred. In the case of the aromatic compounds, the isocyanate groups may be attached either to the same or to different rings. The preferred polyisocyanates are either the commercially available mixture of toluene diisocyanates which contains 80% 2,4-toluene diisocyanate and 20% 2,6-toluene diisocyanate or 4,4'-methylene bis-(phenylisocyanate). Commercially available polymeric aromatic isocyanates having an NCO functionality greater than 2.0 are also quite useful.

Aliphatic compounds such as ethylene diisocyanate, ethylidene diisocyanate, propylene-1,2-diisocyanate, butylene-1,3-diisocyanate, tetramethylene diisocyanate, hexamethylene diisocyanate and decamethylene diisocyanate are suitable as are alicyclic compounds such as 1,2- and 1,4-cyclohexylene diisocyanates and 4,4'-methylene-bis-(cyclohexylisocyanate). Suitable isothiocyanates include hexamethylene diisothiocyanate, m-phenylene diisothiocyanate, m-tolylene diisothiocyanate, and 2,4-toluene diisothiocyanate.

The organic compounds which react with the polyisocyanates and polyisothiocyanates to obtain the NCQ terminated prepolymers are preferably hydroxy, thiol, and amine (primary or secondary) terminated polymers having a molecular weight preferably on the order of 400 or more. Typical polymer backbones include polyethers, polyepihalohydrins, polythioethers, polysulfides, polyesters both of the condensation and lactone type, and polyhydrocarbons.

Illustrative polyethers are the following: poly(oxyethylene) glycols, poly(oxypropylene) glycols, poly(oxypropylene)-poly(oxyethylene) copolymers, poly(oxytetramethylene) glycols, poly(oxybutylene) glycols, the tetrafunctional ethylene oxide-propylene oxide block copolymers initiated with ethylene diamine, and poly(oxypropylene triols initiated with low molecular weight triols such as trimethylolpropane, glycerol, and 1,2,6-hexanetriol.

Thiol terminated poly(oxyalkylene) glycols usually prepared by the acid-actalyzed condensation of thiodiethylene-glycol with itself (i.e., homopolymers of thiodiethyleneglycol) or at elevated temperatures with formaldehyde, paraformaldehyde, etc., or polyols such as 1,4-butanediol, may be employed in the preparation of NCQ terminated prepolymers. Polymers of this type with molecular weights of at least 750 are described in U.S. Pat. No. 2,900,368.

Hydroxy-terminated polysulfides such as are disclosed in U.S. Pat. No. 3,168,119, may also be employed in the practice of this invention.

Other suitable polysulfides are the liquid mercapto terminated polysulfides such as are disclosed in Patrick et al., U.S. Pat. No. 2,466,963, exemplary of which are those available from the Thiokol Corp., under the trade names LP-2 and LP-3.

Exemplary hydroxy terminated polyesters are polyethylenepropylene adipate, polyethylene adipate, polyethylene adipate (70)-phthalate (30), and polyneopentyl sebacate. In general, the most suitable polyesters are chiefly linear in type with melting point levels of 90° C. or lower. The molecular weight may range between 200 and 10,000 and preferably between 1,000 and 3,000.

Hydroxy terminated lactone polyesters such as are described in U.S. Pats. Nos. 3,169,945 and 3,186,971, are also effective in preparing NCQ terminated prepolymers as are hydroxyl terminated polymers from vinyl monomers such as are disclosed in U.S. Pats. Nos. 2,792,382 and 3,055,942.

While not essential, a catalyst may be employed in the preparation of the prepolymer. Suitable catalysts include tertiary amines, such as dimethylcyclohexyl amines, triethylamine, 1,2,4-trimethylpiperazine or heavy metal compounds soluble in the reaction system such as iron-acetoacetate and dibutyltin dilaurate.

The prepolymer reaction conditions and the reaction time vary depending on the kind and molecular weight of the polymer reactants, the kind and the amount of the diisocyanate to be used, and the type of catalyst employed, if any. Generally, a temperature between 50° C. and 150° C. and a reaction time between 5 and 300 minutes is employed.

Catalysts, if employed, are generally present to the extent of about 0.01 to about 1.0% by weight of the total weight of the reactants. For moisture curable prepolymers, 1,2,4-trimethylpiperazine and dibutyltin dilaurate represent the preferred catalysts.

The presence of crosslinks in the cured urethane type polymer is essential to provide the desired physical properties. Crosslinks are introduced in the conventional manner by the presence in the curable system of a branched or polyfunctional material such as tri- or tetra-functional hydroxy, thiol, amine, isocyanate or thioisocyanate compound. Triols, such as polypropylene oxide triols, are the preferred crosslinking agents. The molecular weight per crosslink, Mc, has been defined as "the unit weight of polymer divided by the number of crosslink junctions or branch points in the unit weight of polymer." (Saunders and Frisch, Polyurethanes, Part I, p. 266.) The Mc for the cured polymers of the composition of this invention should be between about 500–50,000 and preferably between 1500 and 10,000. One may vary the tensile strength, elongation and toughness of the polyurethane coatings according to the methods described in "The Relationship Between Polymer Structure and Properties in Urethanes," Rubber Chemistry and Technology, vol. 33, No. 5, p. 1259 (December 1960).

Moisture curable, crosslinkable NCQ terminated prepolymers optionally containing polystyrene resin may be marketed in a single container and applied directly to the concrete or, more preferably, to concrete which has been primed with an adhesion promoter.

In commercial applications (e.g., when coating traffic surfaces in garages) many secondary surfaces (areawise) are encountered, such as rubber or metal flashings, coves, pipes, electrical conduits, light standards, railings, expansion butt plates, etc. To insure proper adhesion between the composite coating and such secondary surfaces, it is desirable to initially prime such surfaces with appropriate primers such as two-part wash primers, epoxies, various silane-containing primers, phenolics or other common adhesion promoting agents.

The moisture curable coatings of this invention are applied directly to the substrate by pouring from the container and spreading the coating using a sawtooth notched rubber squeegee, a paint roller, a standard push broom, or brushes. The notched squeegee application is preferred for applying pourable (500–4000 cps. viscosity) coatings because it is quite easy to obtain the desired dry film thickness by varying the size of the sawtoothed notches. Spray application techniques can also be used.

Heavier bodied coatings (5000–100,000 cps.) are applied by hand trowel, spray or paint roller with greater skill required to obtain the desired film thickness.

The base layer can be applied in a single coat or in two or more coats to obtain the desired film thickness of generally from 10–60 mils. Preferably, the base layer is in the range of about 20 to about 60 mils thick.

The overlayer is preferably in the range of 10 to about 40 mils in thickness, although overlayers of 2 to 10 mils are useful for aesthetic or color matching purposes. When this overlayer is to be greater than 20 mils in thickness, it is preferable to sequentially apply two thin coats which together provide the desired thickness.

For light to moderate traffic areas (pedestrian, automobile parking, driving aisles, etc.) the composite coating is generally about 40 mils in thickness (about 20 mils base layer and about 20 mils overlayer), and for heavy traffic areas the thickness is about 60 mils (about 20 mils base coating and about 40 mils overlayer).

An indication of the ability to maintain a seal over cracked or cracking concrete can be measured for any particular system by a test, (hereinafter referred to as "crack extension test") the details of which are as follows:

A one inch x 2⅜ inch x 40–80 mils thick wet film of the polyurethane coating is cast across the ends of two 3 inch x 2 inch x 1 inch primed concrete blocks which are separated with a small (2 inch x 1½ inch x ⅜ inch) concrete block. The small block is centered on, and firmly bonded to, one side of one of the larger concrete blocks, the top surface of the small block being flush with the top surfaces of the larger blocks, and the blocks are arranged such that the sample bridges a hairline crack at the joint of the small block and one of the larger blocks. Priming is done with a 5% by weight aqueous solution of gamma-aminopropyltriethoxy silane. Following a cure at 75° F./50% RH for a minimum of one week, a 30–60 mil dry film is obtained. Using a tensile machine described in Federal Specification TTS–00230, the larger blocks are separated at a rate of ⅛ inch per hour until the hairline joint is opened to 3/16 inch, and the coating is continually examined for failure in the form of cracking while the blocks are being separated.

Experience has shown that compositions which pass the above test by successfully bridging this 3/16 inch gap at room temperature are useful as base layers and have proved capable of sealing concrete under conditions as can reasonably be expected to be present in actual field use (e.g., −20° F. to 120° F., 20–100% R.H.).

The following represent minimum and preferred properties for polyurethane base layers which are suitable in the practice of this invention, all tests being performed at 75° F.

TABLE I

| Property | Minimum | Preferred |
| --- | --- | --- |
| Percent elongation | 200 | [1] >300 |
| Crack extension, inch_g | | [2] 3/16 |

[1] The greater the elongation the more desirable the base layer.
[2] Without failure.

Other desirable properties are shown in Table II.

TABLE II

| Property | Minimum | Preferred |
| --- | --- | --- |
| Tensile strength, p.s.i | 50 | 200–1,000 |
| Rex Hardness | 20 | 35–75 |
| Adhesion, peel, lbs./in. width | 5 | 15–20 |

The following represent minimum and preferred properties, measured at 75° F., for polyurethane overlayers which are suitable in the practice of the invention:

TABLE III

| Property | Minimum | Preferred |
| --- | --- | --- |
| Percent elongation | 25 | >150 |
| Tear strength, lbs./in | 125 | 300–450 |
| Tensile strength, p.s.i | 800 | >1,200 |
| Rex Hardness | 80 | 85–95 |
| Abrasion resistance (H-22 wheel at 1000 grams–1,000 cycles), grams | [1] 0.75 | [1] 0.2 |
| Adhesion to base coat, peel | ([2]) | |

[1] Maximum weight loss.
[2] 5 lbs./in. width or cohesive failure of base coating.

All data reported herein is taken from degassed coating samples. The degassing procedure as well as the other testing procedures are as follows:

Degassing

The sample is placed in a container and a vacuum drawn of about 5 mm. Hg or less for about 30 minutes. Heavy-bodied coatings must be diluted with heptane to a pourable consistency before degassing.

Casting the film

Following degassing, the film to be tested should be cast immediately in an open aluminum mold, typical measurements being 8 inches wide, 8 inches long, and 20 to 80 mils deep, taking precautions not to introduce air into the sample.

Curing the coating

Place the filled mold on a level surface at 77° F. and 50% relative humidity. After two days at these conditions, remove the coating from the mold; invert the film; and continue the cure for five additional days at the same conditions. A cured film measuring about 15 to 60 mils thick should result.

Preparation of dumbbells

Tensile and elongation data are obtained by testing cured samples in the form of dumbbells illustrated in the attached drawing wherein the figure is a plan view of a dumbbell. The letters designate dimensions as follows: a–2 in., b–1 1/16 in., c–¼ in., d–½ in., e–⅛ in., f–¼ in., g–¼ in. The dumbbells should be free of defects, and from about 15 to 60 mils thick. The maximum thickness variation along the neck of the dumbbell should not exceed 2 mils. Place two bench marks, in ink, ½ inch apart on one side of each dumbbell.

Tensile strength and elongation

Pull the dumbbells to failure on a tensile testing machine having a sensitivity of 1/10 pound, and a jaw separation rate of 2 inches per minute. Record the maximum force and distance between the bench marks just before each specimen fails and calculate tensile strength and elongation in the conventional manner.

Other tests (a) Moisture vapor transmission—according to ASTM E96–53, Method B;
(b) Tear strength determined by ASTM–D–624–54;
(c) Adhesion—Canvas to concrete (concrete primed with 5% by weight gamma-aminopropyltriethoxy silane in water), according to Fed. Test Std. 601–8031 except 180° pull used; and
(d) Abrasion resistance according to ASTM–D–1044 employing an H22 wheel at 1000 grams–1000 cycles.

In order to promote a better understanding of the present invention, the following non-limiting examples are given wherein all parts and percentages are by weight unless otherwise stated.

EXAMPLE 1

A prepolymer useful for providing a base layer is prepared from the following composition:

| Ingredient | Equivalents | Parts/weight |
|---|---|---|
| 2,000 M.W. diol (polypropylene oxide) | 0.3 | 300.6 |
| 4,000 M.W. triol (polypropylene oxide) | 0.6 | 780 |
| Toluene | | 134 |
| Toluene diisocyanate (80/20 mixture by weight of 2,4 and 2,6 isomers) | 1.8 | 156 |
| Dibutyltin dilaurate | | 1.0 |

To a nitrogen purged resin flask is added the diol, triol and toluene. Toluene diisocyanate is added with mixing and the temperature is raised to 80° C. and held at the temperature for 4 hours, then cooled to 60° C. and the dibutyltin dilaurate catalyst added. At this point the prepolymer has a Gardner-Holdt viscosity of 17-27 stokes and a NCO equivalent weight of 1400-1800.

The prepolymer is then combined in the order shown in Table IV with the following ingredients in a one quart Baker-Perkins mixer over which is maintained a dry nitrogen blanket.

TABLE IV

Ingredients: Parts by weight
(1) Titanium dioxide _____ 38.6
(2) Zinc oxide _____ 38.6
(3) Carbon black _____ 0.85
(4) Talc _____ 300
(5) Pyrogenic silica _____ 48
(6) Styrene resin/toluene (56.6% by weight styrene resin) _____ 530
(7) Prepolymer _____ 500
(8) Toluene _____ ~150
(9) Dibutyltin dilaurate _____ 5.0

Prior to mixing with the prepolymer, ingredients (1)-(5) are dried at 350° F. to a moisture content of less than 0.05%.

The composition is then tested with the following results, obtained at 75° F.:

TABLE V

Tensile strength (ASTM D412-64T) _____ 879 p.s.i.
Elongation (ASTM D412-64T) _____ 460%.
Rex hardness _____ 72.
Moisture vapor transmission __ 22 g./sq. meter/day or 3.2 perms.
Crack extension test _____ 3/16 in. at 25° C. without failure.
Application characteristics ____ Suitable for trowel, spray, or squeegee.
Adhesion to concrete surface (ASTM D903-49) _____ 20 lbs./in. width.
Tear strength (ASTM D624-54 (Die C)) _____ 206 lbs./in.
Abrasion resistance _____ 1.5 g. wt. loss.

EXAMPLE 2

Another useful base layer composition is prepared with the following ingredients:

TABLE VI

| | Parts by weight |
|---|---|
| Titanium dioxide | 96.5 |
| Zinc oxide | 96.5 |
| Carbon black | 2.12 |
| Talc | 750.0 |
| Pyrogenic silica | 117.4 |
| Prepolymer of Example 1 | 2085.0 |
| Toluene | 878.0 |
| Dibutyltin dilaurate | 12.6 |

After a 7 day cure at 75° F./50% RH the above composition is tested with the following results obtained at 75° F.:

TABLE VII

Tensile strength _____ 900 p.s.i.
Elongation _____ 440%
Moisture vapor transmission rate _____ 55 grams/sq. meter/day, 8.0 perms.
Adhesion _____ 22 lbs./in. width.
Tear strength _____ 120 lbs./in.
Abrasion resistance _____ 1.0 g. wt. loss.
Crack extension test _____ 75.
Rex hardness _____ 3/16 in. without failure.
Application characteristics ____ Suitable for trowel, spray, or squeegee.

EXAMPLES 3-5

Other useful prepolymers for the base layer are prepared from the reactants of Table VIII below.

TABLE VIII

| Example | Molecular weight Diol | Molecular weight Triol | No. of equivalents of— Diol | No. of equivalents of— Triol | Iso-cyanate type | Equivalents of isocyanate | Mc |
|---|---|---|---|---|---|---|---|
| 3 | a1,000 | c2,500 | 0.500 | 0.750 | TDIe | 2.50 | 4,372 |
| 4 | b1,000 | d134 | 2.00 | 1.35 | TDIe | 5.80 | 5,704 |
| 5 | c2,000 | c4,000 | 0.300 | 0.600 | MDIf | 1.80 | 6,323 | a Polytetramethylene oxide type.
b Poly-ε-caprylactone type.
c Polypropylene oxide type.
d Trimethylolpropane.
e 80/20 2,4-toluene diisocyanate/2,6-toluene diisocyanate.
f Methylene bis(4-phenylisocyanate).

The surface to which the base layer is applied should be dry and clean (i.e., free from surface contaminants such as dust, dirt, oil, etc.). Sandblasting or acid etching (e.g., with muriatic acid) of the concrete surface is preferred. Priming of the concrete surface is also highly preferred.

The overlayer is applied over the base layer after the base layer is cured to a firm, tack-free state. The overlayer is applied according to the same techniques as are used for the application of the base layer (i.e., sawtooth notched squeegee, paint roller, push broom, spray equipment or brush). The purpose of the overlayer is to provide a hard, tough, traffic-durable, abrasion- and wear-resistant surface. Consequently, the NCO terminated prepolymers used for the overlayer must be capable of moisture-curing to a crosslinked, resilient layer which is harder than the base layer and which is tougher and more wear-resistant than the base layer. The overlayer also exhibits higher tensile strength than the base layer.

EXAMPLE 6

A prepolymer useful for the overlayer is prepared from the following ingredients using the same procedure as described above in Example 1:

| Ingredient | Equivalents | Parts/weight |
|---|---|---|
| 1,000 M.W. polypropylene glycol diol | 2.0 | 1,000 |
| 750 M.W. polypropylene glycol triol | 1.0 | 250 |
| Toluene | | ~175 |
| Toluene diisocyanate (80/20 mixture by weight of 2,4 and 2,6 isomers) | 6.0 | 522 |
| Dibutyltin dilaurate | | 0.5 |

The Gardner Holdt viscosity of this composition is 15-25 stokes and the NCO equivalent weight is 600-750.

The prepolymer is then combined in the order shown in Table IX with the following ingredients in a one quart Baker-Perkins mixer over which is maintained a dry nitrogen blanket.

TABLE IX

Ingredients: Parts by weight
(1) Titanium dioxide _____ 25.0
(2) Zinc oxide _____ 25.0
(3) Carbon black _____ 0.5
(4) Talc _____ 350
(5) Antioxidant [1] _____ 5.0
(6) U.V. Absorber [2] _____ 5.0
(7) Prepolymer _____ 500
(8) Toluene _____ ~150
(9) 1,2,4-trimethylpiperazine _____ 1.0

[1] "Zalba Special," a trade name of Du Pont for a fortified, hindered phenol.
[2] "Tinuvin P," a trade name of Geigy Inc. for 2(2'-hydroxy-5'-methylphenyl)benzotriazole.

Prior to mixing with the prepolymer, ingredients (1)–(4) are dried at 350° F. to a moisture content of less than 0.05%. Items (5) and (6) are dried for 16 hours at 185° F.

Cured films made from this composition exhibit the following properties:

TABLE X

Tensile strength _____ 2620 p.s.i.
Elongation _____ 170%.
Rex hardness 75° F. _____ 90.
Adhesion (ASTM D903–49, primed concrete) _____ 20 lbs./in. width.
Tear strength (ASTM D624–54, Die C) _____ 378 lbs./in.
Abrasion resistance _____ 0.2 g. wt. loss.

It has been found that curable compositions which are useful for the overlayer are not suitable as base layers because they do not provide coatings which will bridge cracks under all variations of temperature and environment without cracking. However, when applied to the surface of the base layer, the overlayer does not crack nor does it inhibit the ability of the base layer to bridge cracks successfully. This result was totally unexpected in view of the relatively poor elongation properties of the overlayer.

While the primary utility of the process of this invention relates to coating concrete surfaces, it is to be understood that the process of this invention is particularly suitable for providing a continuous coating for sealing cracks in any type of substrate wherein leakage therethrough would be a problem. The coating may be applied either directly to the concrete, wood, or other substrates such as metal, ceramic tile, terrazo, quarry tile, marble, stone aggregate, foamed insulating surfaces, or indirectly, as to an intermediate coating such as asphalt which had been applied to such substrate. The process of the invention may also be used to protect any surface from wear or degradation due to the elements, e.g., driveways, parking areas, walkways, sidewalks, artificially-surfaced water ponds or pools, promenades, roofs, balconies, etc.

To aid in preventing skidding on the coating surface, conventional anti-skid agents may be added to the composition which is used for the overlayer. For example, finely divided walnut shells, quartz, sand, silicon carbide, aluminum oxide, or other anti-skid materials can be used. It is often preferable to prime the surface of some anti-skid agents before blending them into the composition, e.g., conventional amino silanes are very useful as primers for quartz, sand, silicon carbide and aluminum oxide. The amount of anti-skid agent normally used is about one part by volume for each five parts by volume of coating composition.

For fire-proofing applications, one may include various fire retardant fillers in the coating compositions. For example, useful fire retardant materials such as chlorinated paraffins, antimony oxide, borates or phosphates can be used.

For decorative applications colored quartz granules (typically 11 to 28 mesh) can be applied to a very thin (e.g., 10 mils) wet, uncured overlayer using broadcast distribution methods. After this thin overlayer has cured, all lose quartz granules are removed and a clear, colorless acrylic or urethane seal coat is applied to protect the colored quartz granules from wear. This decorative system is only useful in non-traffic or light pedestrian traffic areas.

What is claimed is:
1. A process for sealing a surface to prevent leakage through cracks therein in a manner such that the sealed surface is also traffic-durable, the process comprising:
 (a) applying to said surface a base layer comprising at least one coating comprising a moisture curable, crosslinkable NCQ terminated prepolymer, wherein Q is oxygen or sulfur, wherein said prepolymer, upon curing in the presence of moisture, provides a resilient, elastomeric, crosslinked polymer coating capable of sealing said surface,
 (b) curing said crosslinkable NCQ terminated prepolymer to provide a crosslinked polymer coating which exhibits an elongation of at least 200%, a tensile strength of at least 50 p.s.i., a peel adhesion of at least 5 lbs./in. width, and a crack extension characteristic of at least 3/16 inch at room temperature,
 (c) applying to said cured base layer a flexible, traffic-durable, abrasion-resistant overlayer comprising at least one coating comprising a moisture-curable, crosslinkable, NCQ terminated prepolymer, wherein Q is oxygen or sulfur; wherein said prepolymer, upon curing in the presence of moisture, provides a resilient, crosslinked polymer coating; and
 (d) curing said crosslinkable NCQ terminated prepolymer of said overlayer to provide an abrasion-resistant crosslinked polymer coating which exhibits an elongation of at least 25%, a tensile strength of at least 800 p.s.i., a tear strength of at least 125 lbs./in., and a peel adhesion to said base layer of at least 5 lbs./in. width; wherein said base layer exhibits higher elongation than said overlayer.

2. The process of claim 1, wherein each said prepolymer comprises the reaction product of at least one polyol and a polyisocyanate.

3. The process of claim 1, wherein each said prepolymer comprises the reaction product of at least one polyether polyol and toluene diisocyanate.

4. The process of claim 1, wherein each said NCQ terminated prepolymer is the reaction product of a toluene diisocyanate and at least one hydroxy terminated polypropylene oxide.

5. The process of claim 1, wherein said surface is concrete.

6. A process in accordance with claim 1, wherein said overlayer is harder than, and is more abrasion-resistant than, said base layer.

7. A process in accordance with claim 6, wherein each said prepolymer comprises the reaction product of at least one polyol and a polyisocyanate.

8. A process in accordance with claim 6, wherein each said prepolymer comprises the reaction product of at least one polyether polyol and toluene diisocyanate.

9. The process of claim 6, wherein each said NCQ terminated prepolymer is the reaction product of a toluene diisocyanate and at least one hydroxy terminated polypropylene oxide.

10. The process of claim 6, wherein said surface is concrete.

11. The process of claim 6, wherein said surface is asphaltic.

12. The process of claim 6, wherein said surface is wood.

13. The process of claim 6, wherein a polystyrene resin is included in said base layer in an amount less than 75% by weight of said crosslinked polymer.

14. A composite structure comprising:
   (a) a traffic surface,
   (b) a base layer firmly bonded to said traffic surface, said base layer comprising a resilient, crosslinked polymer, said polymer being derived from a moisture curable, crosslinkable NCQ terminated prepolymer, wherein Q is oxygen or sulfur; said base layer having an elongation of at least 200%, a tensile strength of at least 50 p.s.i., and a crack extension characteristic of at least 3/16 inch at room temperature; and
   (c) a tough, hard, wear- and abrasion-resistant overlayer bonded to the surface of said base layer, said overlayer comprising at least one coating comprising a resilient, crosslinked polymer, said polymer being derived from a moisture curable, cross-linkable NCQ terminated prepolymer, wherein Q is oxygen or sulfur; said overlayer having an elongation of at least 25%, a tensile strength of at least 800 p.s.i., and a tear strength of at least 125 lbs./in.; said overlayer having a peel adhesion to said base layer of at least 5 lbs./in. width; wherein said base layer exhibits higher elongation than said overlayer.

15. A composite structure in accordance with claim 14, wherein said traffic surface is concrete.

16. A composite structure in accordance with claim 14, wherein said traffic surface is asphalt.

References Cited

UNITED STATES PATENTS

| | | | |
|---|---|---|---|
| 3,549,404 | 12/1970 | Liberti et al. | 117—72 X |
| 3,499,783 | 3/1970 | Nelson et al. | 117—72 |
| 3,357,939 | 12/1967 | Reischl et al. | 260—859 R X |
| 3,358,052 | 12/1967 | Archer et al. | 260—859 R |
| 3,385,909 | 5/1968 | Haag | 260—859 R |
| 3,272,098 | 9/1966 | Buchholtz et al. | 260—77.5AP X |
| 3,008,917 | 11/1961 | Park et al. | 260—859 R |
| 3,422,054 | 1/1969 | Kelly | 260—77.5 AP X |
| 3,391,101 | 7/1968 | Kelly et al. | 260—77.5 AP X |
| 3,386,962 | 6/1968 | Damusis | 260—77.5 AP |
| 3,594,352 | 7/1971 | Lloyd et al. | 260—77.5 AP |
| 3,650,795 | 3/1972 | Willingham | 117—161 KP X |

RALPH HUSACK, Primary Examiner

U.S. Cl. X.R.

117—2, 26, 54, 75, 123 D, 136, 138, 148, 161 KP; 260—77.5 AP, 859 R